(12) United States Patent
Rickrode

(10) Patent No.: US 6,857,215 B1
(45) Date of Patent: Feb. 22, 2005

(54) HOLDER TO USE RECENTLY KILLED FOWL AS DECOYS

(76) Inventor: David A. Rickrode, 11 Stonemill, Dove Canyon, CA (US) 92679

( * ) Notice: Subject to any disclaimer, the term of this patent is extended or adjusted under 35 U.S.C. 154(b) by 53 days.

(21) Appl. No.: 10/690,535

(22) Filed: Oct. 23, 2003

(51) Int. Cl.$^7$ .............................................. A01M 31/06
(52) U.S. Cl. ................................................... 43/3; 43/2
(58) Field of Search ........................... 43/2, 3; 248/530, 248/156, 146, 508, 219.2, 688, 545; 119/713, 714

(56) References Cited

U.S. PATENT DOCUMENTS

| | | | | |
|---|---|---|---|---|
| 230,600 A | * | 8/1880 | Allen | 43/3 |
| 843,588 A | * | 2/1907 | Ditto | 43/3 |
| 892,528 A | | 7/1908 | Kricke | |
| 1,879,991 A | | 9/1932 | Pratt | |
| 2,812,608 A | * | 11/1957 | Jones | 43/3 |
| 4,689,913 A | | 9/1987 | Brice | |

FOREIGN PATENT DOCUMENTS

| | | |
|---|---|---|
| EP | 0 071 461 A1 | 2/1983 |
| GB | 934648 | 8/1963 |
| GB | 2 067 064 A | 7/1980 |

* cited by examiner

Primary Examiner—Michael J. Carone
Assistant Examiner—T. Nguyen
(74) Attorney, Agent, or Firm—Richard C. Litman

(57) ABSTRACT

The holder to use recently killed fowl as decoys is a simple wire apparatus that assists wildfowl hunters by supporting a recently killed bird for use as a decoy. A wire frame supports the body of a recently killed game bird such as a duck or goose. Rigid wire arms extend to the sides to support the bird's wings, and a wire arm extends forward to support the bird's head and neck. The bird is supported above the ground, with wings outstretched, in a realistic position and pose that resembles a live bird about to land on the ground. The wire frame itself is rigid enough to support the bird, yet flexible to allow for movement of the bird in a breeze or light wind. The wire arms are bendable to alter the position of the bird's wings, head and neck.

13 Claims, 3 Drawing Sheets

US 6,857,215 B1

HOLDER TO USE RECENTLY KILLED FOWL AS DECOYS

BACKGROUND OF THE INVENTION

1. Field of the Invention

The present invention relates to hunting decoys for attracting wild game. More specifically, the invention is a holder to use recently killed fowl as decoys.

2. Description of the Related Art

The use of decoys in sport hunting is well known, and has been practiced for many years. Wildfowl hunters, in particular, often use numerous decoys to draw in their prey. Hand carved wooden decoys are often the product of skilled artisans who painstakingly craft the decoys, which are exquisitely crafted and finely detailed to accurately portray real ducks or geese.

Numerous methods have been employed to fashion decoys that are more realistic and life-like in order to increase the ability of decoys to attract wild birds into the range of the hunter(s). One method is to use freshly killed birds themselves for decoys. Several devices have been made to support freshly killed birds, or to restrain live birds, for use as decoys.

U.S. Pat. No. 892,528, issued on Jul. 7, 1908 to H. Kricke, discloses a decoy support for holding a freshly killed wildfowl on a float for use as a decoy. U.S. Pat. No. 1,879,991, issued on Sep. 27, 1932 to W. Pratt, discloses a halter for live duck or geese decoys.

U.S. Pat. No. 4,689,913, issued on Sep. 1, 1987 to R. Brice, discloses a collapsible decoy, comprising a collapsible frame with a flexible covering. U.K. Patent No. 934,648, published Aug. 21, 1963, discloses a device for standing a dead bird in an erect position as a decoy. The device supports a bird, such as a pigeon, in a standing position.

U.K. Patent No. 2,067,064, published on Jul. 22, 1980, discloses a decoy device using a dead or artificial pigeon. The device comprises a wire cradle for supporting a dead or artificial pigeon. Wire arms are joined to the cradle, each arm having two pieces joined together by a coil spring. The wire arms clip to the birds wings, and are operable by a thin cord to move the wings from an open to a closed position, against the coil spring bias.

European Patent No. 71,461, published on Feb. 9, 1983, discloses a bird decoy, the decoy having an elongated chassis with a spike on which the body of a dead bird can be impaled. Arms are pivotally mounted to the nose of the chassis, and the arms carry "crocodile" clips to grip the wings of the bird. The arms are operable by a cord to move the bird's wings, simulating the wing-flapping movement of a live bird.

None of the above inventions and patents, taken either singly or in combination, is seen to describe the instant invention as claimed. Thus a holder to use recently killed fowl as decoys solving the aforementioned problems is desired.

SUMMARY OF THE INVENTION

The holder to use recently killed fowl as decoys is a simple wire apparatus that assists wildfowl hunters by supporting a recently killed bird for use as a decoy.

A wire frame supports the body of a recently killed game bird such as a duck or goose. Rigid wire arms extend to the sides to support the bird's wings, and a wire arm extends forward to support the bird's head and neck.

The bird is supported above the ground, with wings outstretched, in a realistic position and pose that resembles a live bird about to land on the ground. The wire frame itself is rigid enough to support the bird, yet flexible to allow for movement of the bird in a breeze or light wind. The wire arms are bendable to alter the position of the bird's wings, head and neck.

Accordingly, it is a principal object of the invention to provide a holder to use recently killed fowl as decoys.

It is another object of the invention to provide a holder to support a recently killed fowl elevated above the ground for use as a decoy.

It is a further object of the invention to provide a holder to support a recently killed fowl elevated above the ground with its wings outstretched for use as a decoy.

Still another object of the invention is to provide a holder to support a recently killed fowl elevated above the ground with its wings outstretched in a realistic flight position for use as a decoy.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
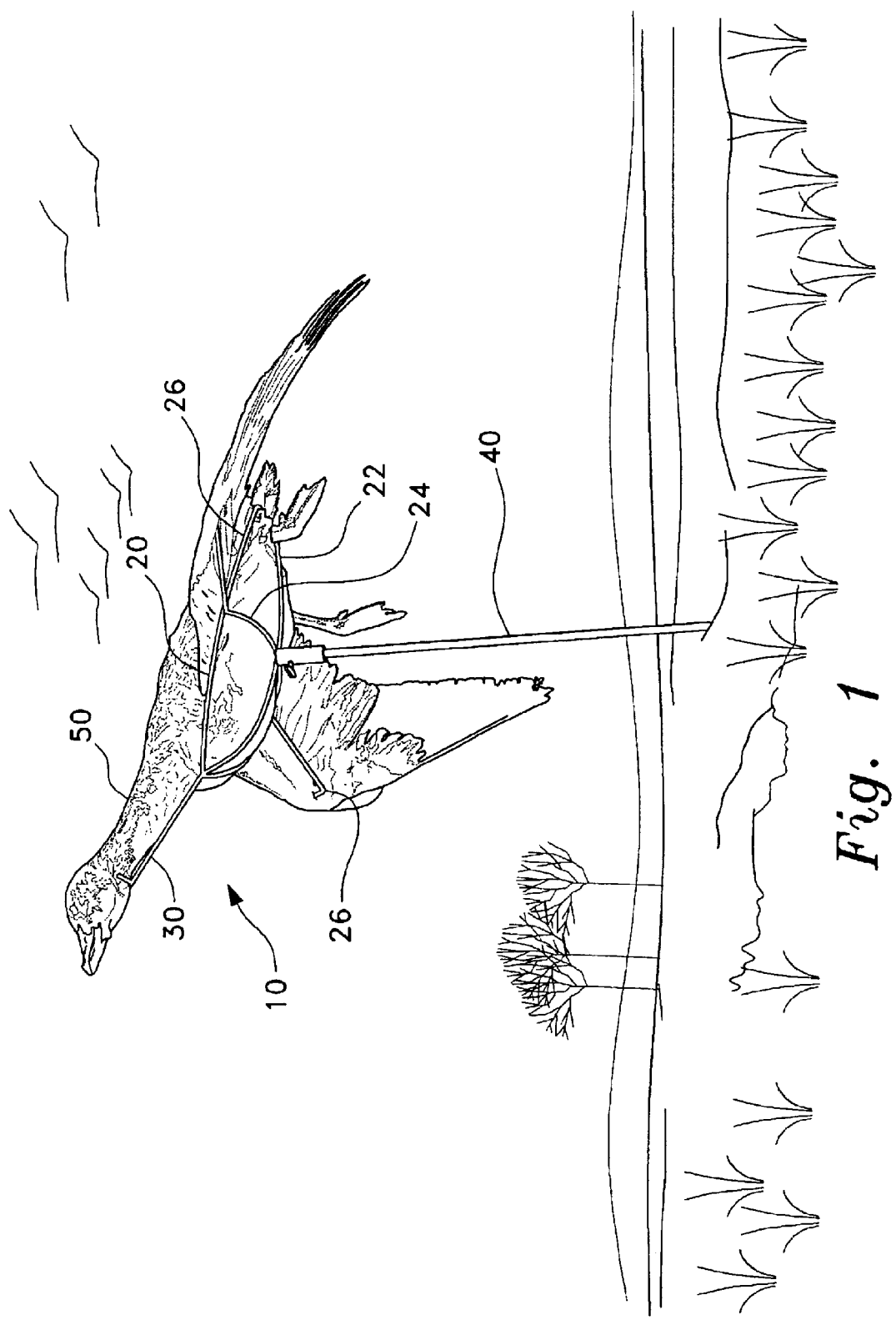
FIG. 1 is an environmental, perspective view of a holder to use recently killed fowl as decoys according to the present invention.
Figure 2:
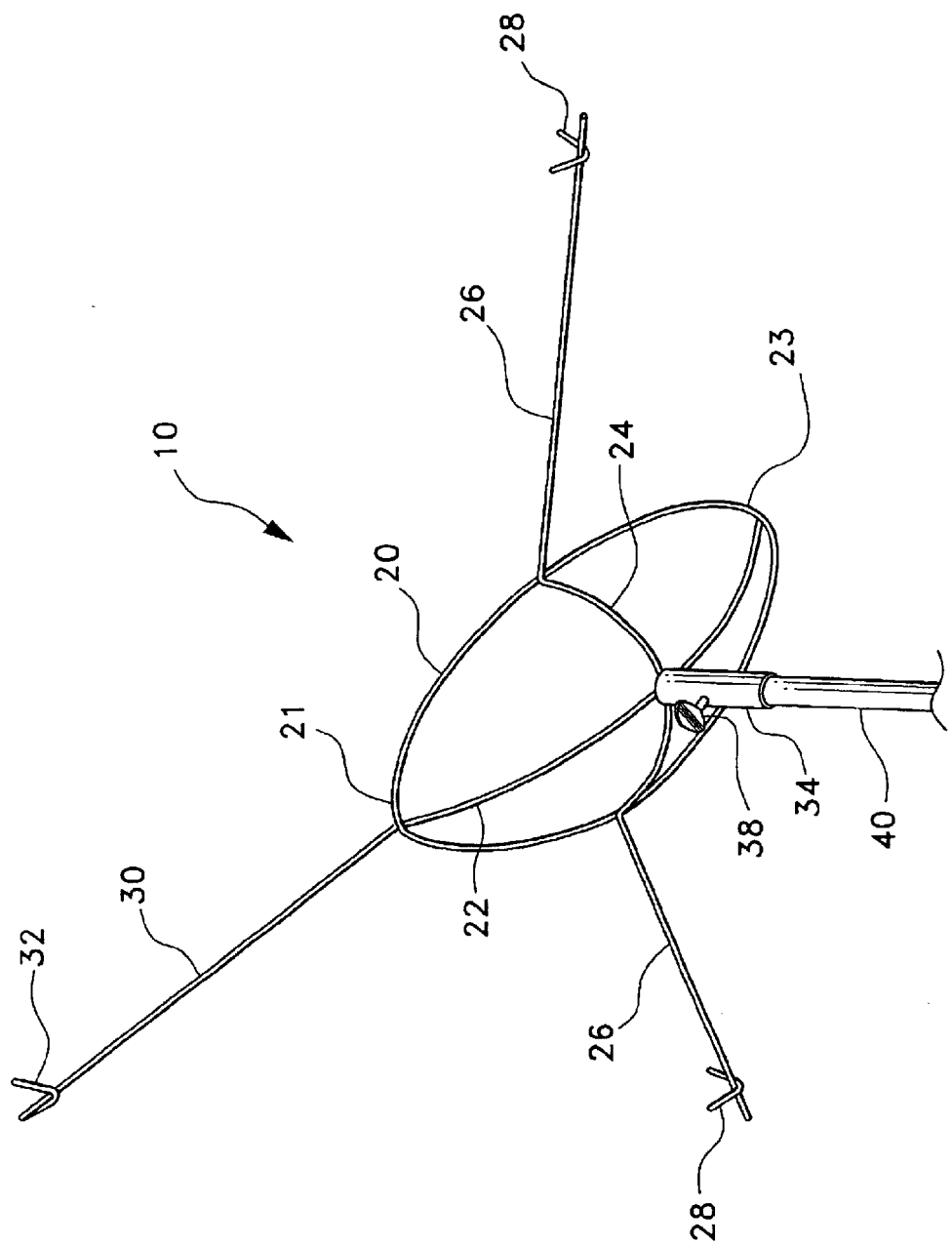
FIG. 2 is a perspective view of a holder to use recently killed fowl as decoys according to the present invention.
Figure 3:
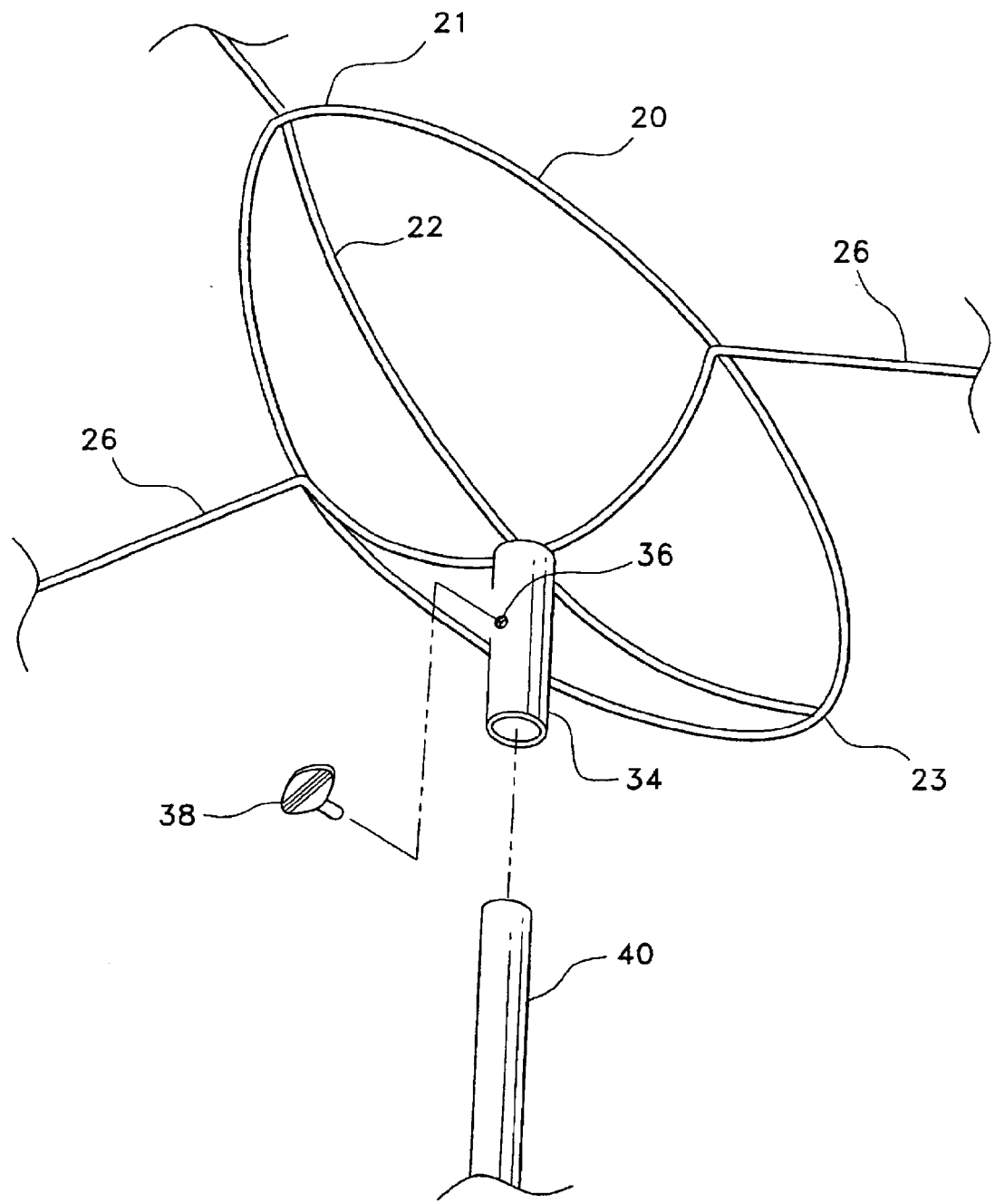
FIG. 3 is an exploded view of a mounting tube supporting a holder to use recently killed fowl as decoys according to the present invention.

The present invention is a holder to use recently killed fowl as decoys, designated generally as 10 in the drawings. Referring to FIGS. 1–3, the holder to use recently killed fowl as decoys 10 supports a recently killed wildfowl 50, such as a duck or goose, in a realistic position that resembles a live bird about to land on the ground.

The holder to use recently killed fowl as decoys 10 comprises an oval basket constructed of an oval basket rim 20, a longitudinal support 22, and a lateral support 24. The basket rim 20 is an oval loop of a heavy gauge wire formed in a general size and shape of the body of a wildfowl such as a duck or goose. It can be appreciated that the size of the basket rim 20 and the basket can be varied to accommodate wildfowl of varying sizes. The basket rim 20 has a front end 21 and a rear end 23.

The longitudinal support 22 is a wire member extending longitudinally from the front end 21 of the basket rim 20 to the rear end 23 of the basket rim 20, the longitudinal support 22 being fixed to the basket rim 20 at each end.

The lateral support 24 is a wire member extending laterally across the basket rim 20, the lateral support 24 being fixed to the basket rim 20 at each side of the basket rim 20.

Both the longitudinal support 22 and the lateral support 24 are arcuately shaped to form, along with the basket rim, a basket for supporting the body of a wildfowl.

Wing support arms 26 extend from each side of the basket rim. A wing holder 28 is disposed on each of the wing support arms 26, near the end of the wing support arm 26 away from the basket rim 20. Each wing holder 28 is a short length of wire that is bent to form a "V" shape. The apex of the "V" is attached to the wing support arm 26, and the arms of the "V" extend upward. The wing support arms 26 are wire arms, formed of a heavy gauge wire of sufficient strength and rigidity to support the wildfowl's wings. Additionally, it is desirable for the wing support arms 26 to be flexible enough that the wildfowl's wings can be moved by a light wind or breeze. The wing support arms 26 are angled slightly downward relative to a plane defined by the basket rim 20 to give the wildfowl 50 with its wings extended slightly downward, giving the appearance that the wildfowl 50 is in flight and about to land.

A head and neck support arm 30 extends from the front end 21 of the basket rim 20. A neck holder 32 is disposed on the head and neck support arm 30, near the end of the head and neck support arm 30 away from the basket rim 20. The neck holder 32 is a short length of wire that is bent to form a "V" shape. The apex of the "V" is attached to the head and neck support arm 30, and the arms of the "V" extend upward. The head and neck support arm 30 is a wire arm formed of a heavy gauge wire of sufficient strength and rigidity to support the wildfowl's head and neck.

A mounting clamp is disposed on the basket and consists essentially of a clamp screw 38 and a mounting tube 34 mounted at the intersection of the longitudinal support 22 and the lateral support 24, and extending below the basket. The mounting tube 34 facilitates mounting the holder to use recently killed fowl as decoys 10 atop a supporting post 40 that may be driven into the ground to support the holder to use recently killed fowl as decoys 10. A threaded aperture 36 is defined in the side of the mounting tube 34 to receive the clamp screw 38. The clamp screw 38 is used to clamp the holder to use recently killed fowl as decoys 10 firmly to the supporting post 40.

It is to be understood that the present invention is not limited to the embodiment described above, but encompasses any and all embodiments within the scope of the following claims.

I claim:

1. A holder to use recently killed fowl as decoys, comprising:
   an oval basket having a front end, a rear end, and two sides;
   a head and neck support arm having front and rear ends, the rear end being fastened to the front end of said basket and the front end extending forward from the front end of said basket;
   a wing support arm extending sideward from each of the two sides of said basket; and
   a wing holder disposed on each wing support arm near the end of the wing support arm away from said basket, each wing holder being a length of heavy gauge wire formed generally into a "V" shape having an apex and two arms, the apex being fastened to a wing support arm and the two arms extending upward.

2. The holder to use recently killed fowl as decoys according to claim 1, wherein said oval basket comprises:
   an oval rim having a front end, rear end, and two sides, the rim defining a plane;
   a longitudinal support extending from the front end of said rim to the rear end of said rim, the longitudinal support being fastened to said rim at each end; and
   a lateral support extending between the two sides of said rim.

3. The holder to use recently killed fowl as decoys according to claim 2, wherein said rim is made from a length of heavy gauge wire formed into an oval.

4. The holder to use recently killed fowl as decoys according to claim 2, wherein said longitudinal support is a length of heavy gauge wire having first and second ends, the first end being fastened to the front end of said rim and the second end being fastened to the rear end of said rim.

5. The holder to use recently killed fowl as decoys according to claim 2, wherein said lateral support is a length of heavy gauge wire having first and second ends, the first end being fastened to one side of said rim and the second end being fastened to the other side of said rim.

6. The holder to use recently killed fowl as decoys according to claim 2 wherein said longitudinal support and said lateral support are arcuately shaped.

7. The holder to use recently killed fowl as decoys according to claim 1, wherein said head and neck support arm is made from a length of heavy gauge wire.

8. The holder to use recently killed fowl as decoys according to claim 1, further comprising a neck holder disposed near the front end of said head and neck support arm.

9. The holder to use recently killed fowl as decoys according to claim 8, wherein said neck holder is a length of heavy gauge wire formed generally into a "V" shape having an apex and two arms, the apex being fastened to said head and neck support arm and the two arms extending upward.

10. The holder to use recently killed fowl as decoys according to claim 1, wherein each of said wing support arms comprises a length of heavy gauge wire.

11. The holder to use recently killed fowl as decoys according to claim 1, further comprising a mounting clamp disposed on said basket.

12. The holder to use recently killed fowl as decoys according to claim 11, wherein said mounting clamp comprises:
   a mounting tube fastened to and extending downward from said basket, the mounting tube having a threaded aperture defined therein, the mounting tube being adapted to be placed over an end of a supporting post; and
   a clamp screw removably engaged with said threaded aperture.

13. The holder to use recently killed fowl as decoys according to claim 2, wherein said wing support arms are angled slightly downward from the plane of said rim.

* * * * *